May 13, 1941.　　　G. W. CHESTER　　　2,242,112
HYDRAULIC TRANSMISSION
Filed Oct. 16, 1939　　　3 Sheets-Sheet 2
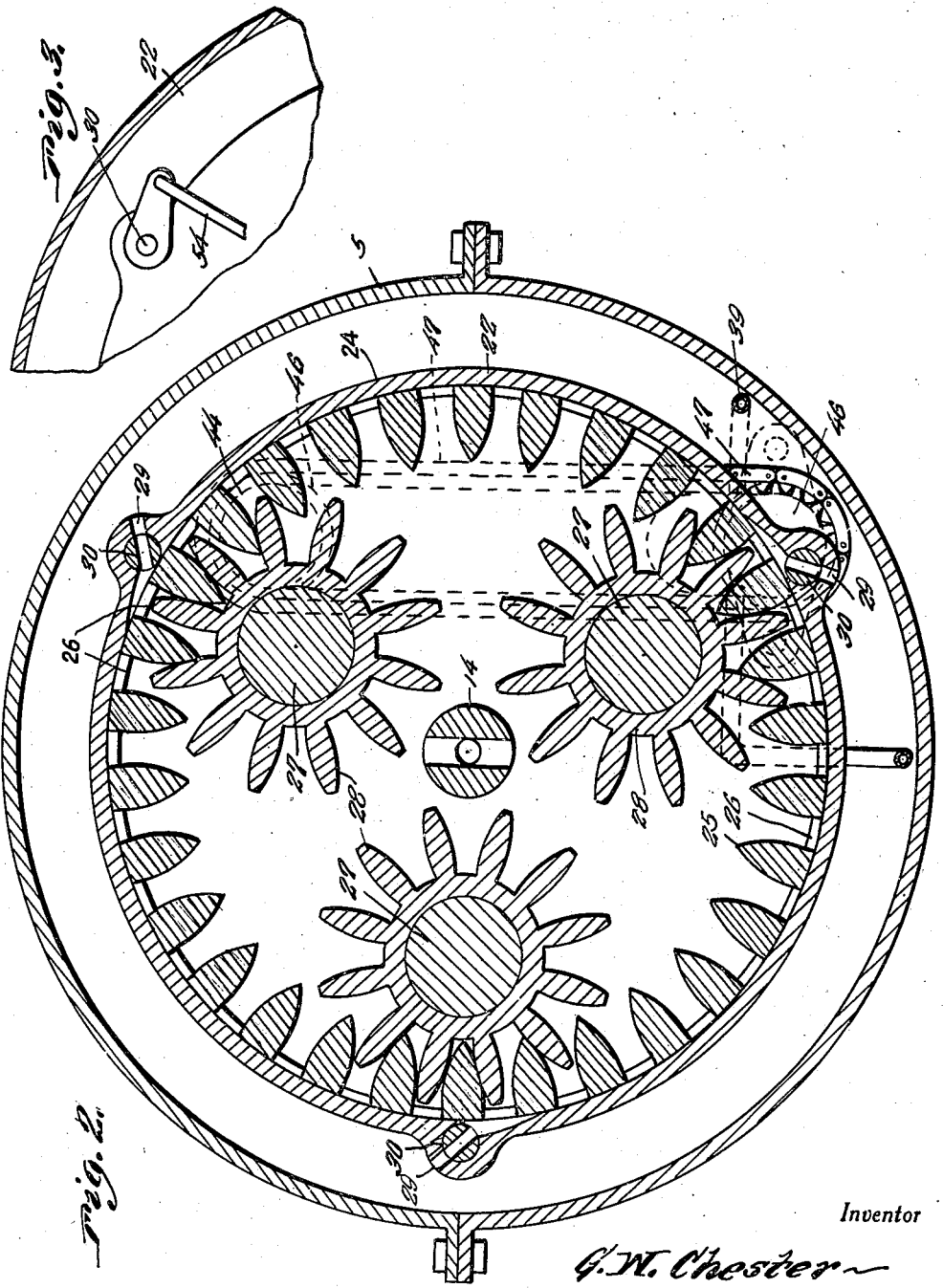
Inventor
G. W. Chester
By Clarence A. O'Brien
and Hyman Berman
Attorneys May 13, 1941.  G. W. CHESTER  2,242,112
HYDRAULIC TRANSMISSION
Filed Oct. 16, 1939  3 Sheets-Sheet 3
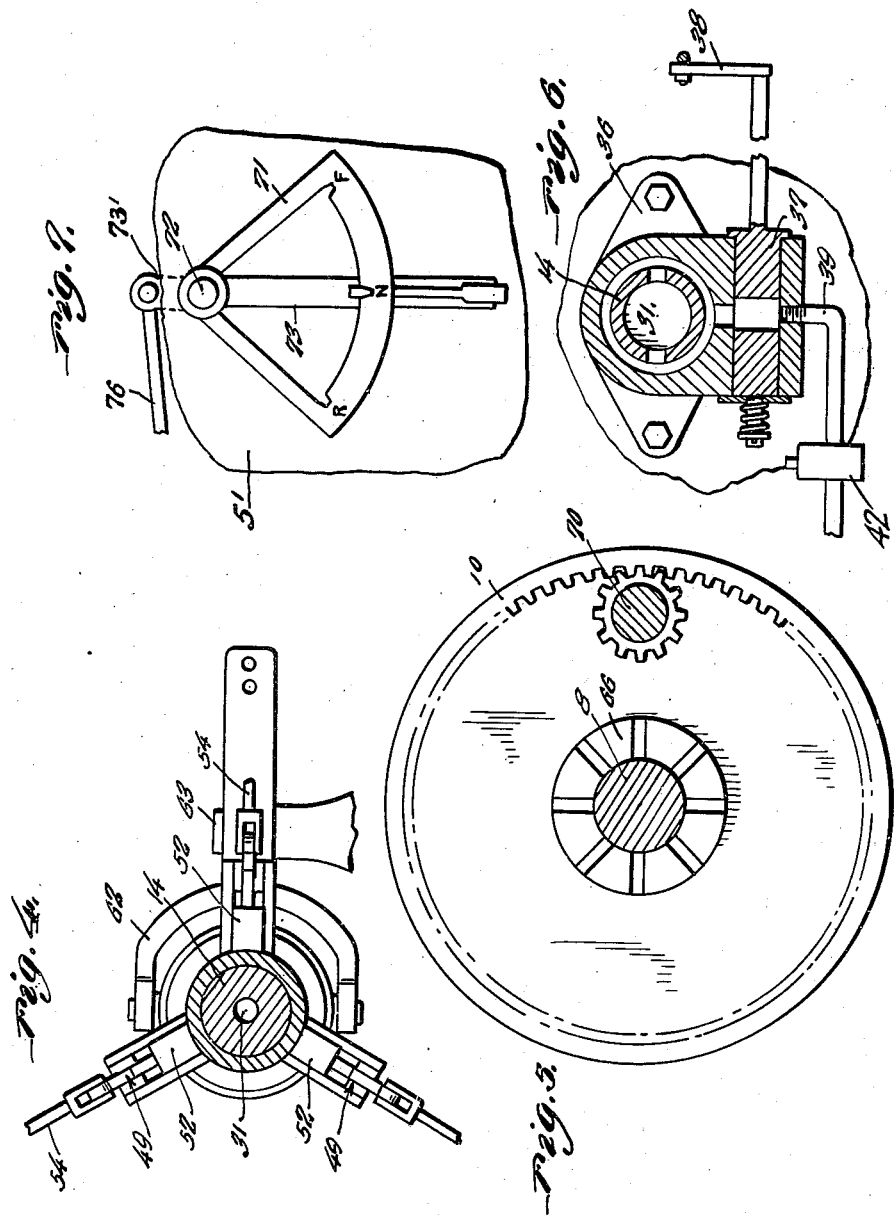
Inventor
G. W. Chester
By Clarence A. O'Brien
and Hyman Berman
Attorneys Patented May 13, 1941

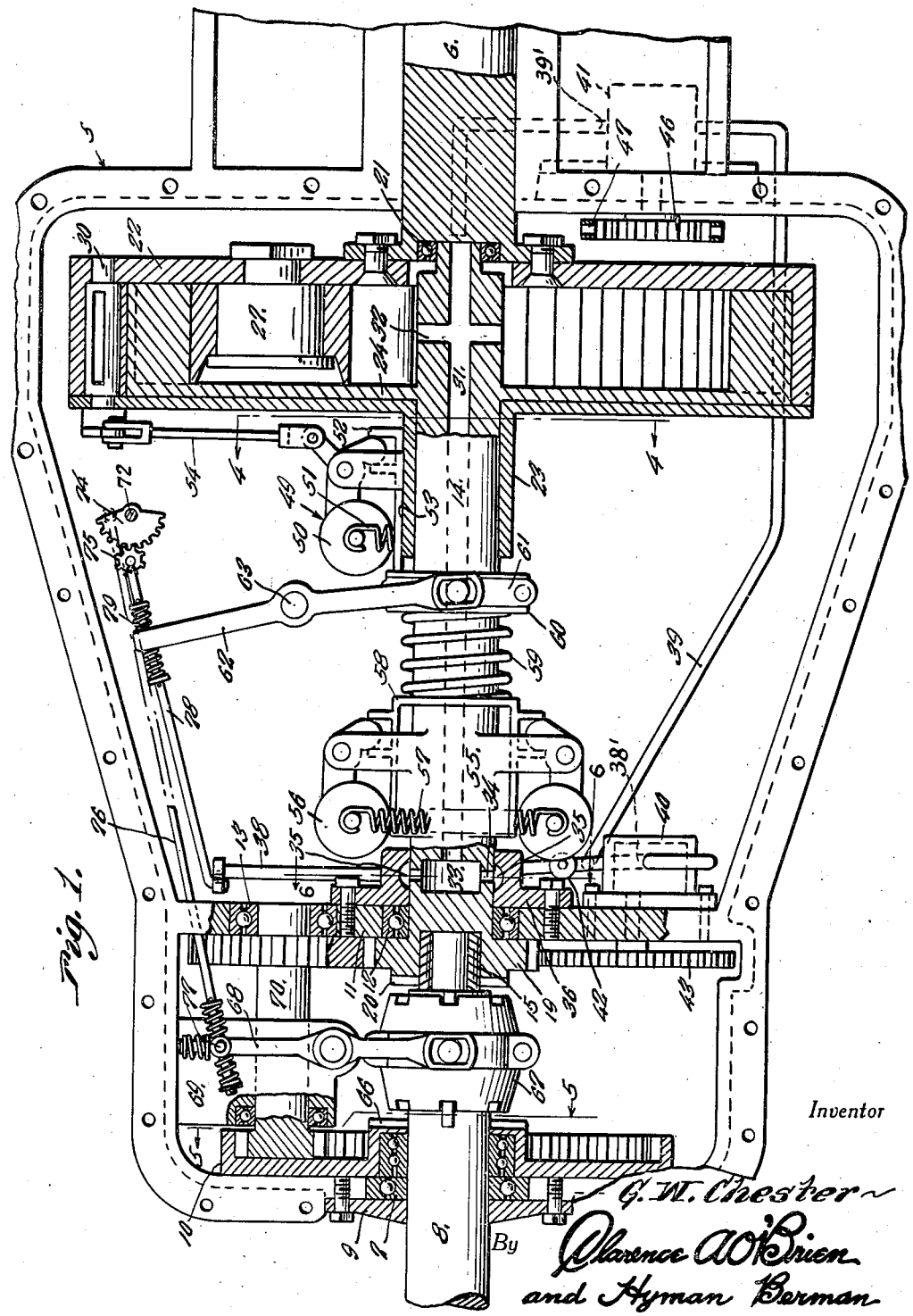

2,242,112

UNITED STATES PATENT OFFICE 2,242,112

HYDRAULIC TRANSMISSION

Gifford W. Chester, Springfield, Mo.

Application October 16, 1939, Serial No. 299,743

5 Claims. (Cl. 192—61)

This invention relates to a hydraulic transmission, and has for the primary object the provision of a device of this character which will provide a variable speed transmission between drive and driven shafts with a constant torque drive at all speeds and further will provide a clutch between said shafts and will operate smoothly and quietly and under manual control whereby the varying speeds may be had between the shafts at will and a reverse drive to the driven shaft when desired and eliminate friction to a minimum.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a horizontal sectional view illustrating a hydraulic transmission constructed in accordance with my invention.

Figure 2 is a transverse sectional view showing the means which provide the variable speeds to the transmission.

Figure 3 is a detail sectional view illustrating one of the valve arms.

Figure 4 is a detail sectional view taken on the line 4—4 of Figure 1.

Figure 5 is a sectional view taken on the line 5—5 of Figure 1.

Figure 6 is a detail sectional view illustrating a control valve taken on the line 6—6 of Figure 1.

Figure 7 is a fragmentary plan view illustrating a control lever and its quadrant.

Referring in detail to the drawings, the numeral 5 indicates a housing for the transmission and is preferably provided with a removable cover (not shown). The housing 5, as shown in Figure 1 has the cover removed and one end thereof provides a journal for a drive shaft 6 while the opposite end is equipped with anti-friction bearings 7 for the support of a driven shaft 8 arranged in direct alignment with the drive shaft. A cap 9 is removably mounted on the latter-named end of the housing 5 for the retention of the anti-friction bearing. The anti-friction bearing also supports a ring gear 10 which forms a part of a reverse mechanism and which will be hereinafter more fully described.

A spider type wall 11 traverses the housing 5 and is located adjacent the end wall of the housing which supports the driven shaft 8 and supports anti-friction bearings 12 and 13. The anti-friction bearing 12 carries one end of an intermediate shaft 14 and the latter has a bearing 15 in one end thereof for supporting or piloting the driven shaft 8 and also has formed integrally with said end a gear 19 including a clutch face 20. The other end of the shaft 14 is piloted into the end of the drive shaft 6, an anti-friction bearing 21 being provided in the drive shaft 6 for the support of the intermediate shaft 14.

A drum-like casing 22 is secured on the drive shaft 6 within the housing 5 and has the intermediate shaft 14 extending centrally therethrough and is provided with a hub portion 23 which surrounds the intermediate shaft and acts as a support for the casing 22 thereon. A ring gear 24 is formed on the intermediate shaft within the casing 22 and has frictional contact with the walls of the latter. The teeth of the ring gear are indicated by the character 25 and arranged between the teeth are ports 26. The ports in the ring gear lie opposite to the peripheral wall of the casing 22. Stub shafts 27 are secured on one of the end walls of the casing 22 and rotatably support gears 28 which mesh with the teeth of the ring gear 24 and coact therewith in forming a plurality of fluid pumps. The peripheral wall of the casing 22 is provided with outlet ports 29 which connect the interior of the casing 22 with the interior of the housing 5 by way of the ports of the ring gear.

It will be seen from Figure 2 that only certain of the ports of the ring gear are in communication with the outlet ports 29 at one time and those ports of the ring gear which lie adjacent to the gears 28. Rotary valves 30 are mounted in the peripheral wall of the casing 22 for controlling the outlet ports.

The intermediate shaft 14 has a fluid passage 31 which connects with the interior of the casing 22 by way of ports 32 and also connects with a chamber 33 formed in the intermediate shaft and which chamber opens outwardly of the shaft by a plurality of ports 34. The ports 34 connect with an annular chamber 35 formed in a collar-like member 36 which is removably mounted on the wall 11 and through which extends the intermediate shaft 14 and acts as a cap for retaining the anti-friction bearing 12 in place. The member 36 forms a part of a valve housing in which is journaled a main control valve 37, the stem of which is equipped with an arm 38 whereby said main control valve may be moved to open and close a fluid supply pipe 39 to the chamber 33. The fluid supply pipe 39 is connected to outlets of gear type pumps 40 and 41 and is provided with a relief valve 42. The inlets of the pumps are provided with inlet pipes 38' and 39' leading to low places within the housing 5 to obtain fluid therefrom. The pump 40 is carried by the wall 11 and is connected to the gear 19 by a gear 43. The pump 41 is mounted on the housing 5 and is connected to a shaft 44 by sprocket gears 46 and a sprocket chain 47. The shaft 44 is driven by the power source which drives the drive shaft 6. When the valve 37 is in a closed position the relief valve 42 will automatically open and allow the discharge of fluid from the pumps to return to the housing 5. However, when the valve 37 is opened the pumps force fluid into the chamber 33 and casing 22 to fill the latter completely with fluid and when the valves 30 are in a closed position the fluid is trapped in the casing 22 and the relief valve 42 will automatically open when a predetermined pressure of fluid in the casing 22 is obtained allowing the fluid from the pumps to bypass back to the housing 5. However, when the valves 30 are opened or partly opened the relief valve closes and permits the proper amount of liquid to be maintained in the casing 22.

A governor 49 is mounted on and rotates with the hub 23 of the housing 22 and includes weighted pivoted arms 50 connected by coil springs 51 acting to move the weighted ends of the arms toward the intermediate shaft, centrifugal force acting to swing the weighted ends of the arms away from the intermediate shaft. The pivoted ends of the arms engage a grooved portion 52 of connected plates 53 slidable on the hub 23 of the casing. The governor arms are connected to the valves 30 by links 54 for closing the valves when said arms are thrown outwardly from the intermediate shaft by centrifugal action and to open the valves on the reverse movement of the governor arms.

A governor 55 is secured on the intermediate shaft 14 and includes weighted arms 56 spring influenced by springs 57 and have their pivoted ends in engagement with a grooved slidable member 58 which bears against one end of a coil spring 59 mounted on the intermediate shaft 14. The member 58 is slidably mounted on the intermediate shaft 14. The other end of the coil spring 59 bears against a grooved collar 60 which connects the plates 53 of the governor 49. The collar 60 is slidably mounted on the intermediate shaft 14 and is formed on the plates 53 whereby said plates are held in sliding engagement with the sleeve 23. The collar 60 has journaled thereon a yoke 61 to which is pivoted a forked end of a control lever 62 pivotally mounted in the housing, as shown at 63. The governor 55 is for the purpose of releasing the tension on the spring 59 and allowing the collar 60 to slide to the left in Figure 1 for the purpose of allowing a greater outward throw of the governor arms 50 of the governor 49 to completely open the valves 30.

The ring gear 10 has a clutch face 66 disposed opposite to the clutch face 20 and splined on the driven shaft 8 between said clutch faces is a clutch element 67 operatively connected to a control lever 68 pivotally mounted in the housing 5 on a bearing member 69 acting as a journal for a jack shaft 70. The clutch element 67 may have a neutral position, that is, disengaged from either of the clutch faces 20 or 66. However, on movement of the control lever 68 in one direction the clutch element will be moved into engagement with the clutch face 20 and establish a direct drive from the intermediate shaft to the driven shaft. A reverse movement of the control lever 68 will engage the clutch element 67 with the clutch face 66 and connect the driven shaft 8 to the ring gear 10 and the latter being geared to the jack shaft and said jack shaft geared to the gear 19 the driven shaft will be rotated in a reverse direction by the intermediate shaft.

A quadrant 71 is suitably mounted on the exterior of the housing cover, a portion of which is indicated at 51 in Figure 7, and rotatably supports a shaft 72 extending into the housing 5 and carries upon its outer end a main control lever 73. The control lever 73 has three positions on the quadrant, namely, neutral position, forward position and reverse position, said positions being indicated by the characters N, R and F. The inner end of the shaft 72 has secured thereon a segmental gear 74 meshing with a pinion 75 suitably journaled in the housing 5. The inner end of the main control lever 73 has a rod 76 pivoted thereto. The pivotal connection between the rod 76 and the main control lever 73 may be by an arm 73' formed on the shaft 72 with the arm 73' arranged within the housing 5. The rod 76 is yieldably connected to the control lever 68 as shown at 77. A rod 78 is eccentrically pivoted on the pinion 75 and extends through an opening in the control lever 62 and is pivoted onto an arm carried by the control lever 38. The rod 78 is yieldably connected to the control lever 62, as shown at 79.

When the main control lever 73 is moved from a neutral position to a reverse position on the quadrant 71 the clutch element 67 is caused to engage with the clutch face 66 and bring about a reverse drive of the driven shaft from the intermediate shaft 14. The movement of the main control lever 73 to a forward position on the quadrant indicated by the character F will engage the clutch element 67 with the clutch face 20 and thereby establish a direct drive between the intermediate shaft and the driven shaft. Whenever the main control lever 73 is moved from a neutral position to either reverse or forward positions the main control valve 37 is opened and also the control lever 62 is pivoted to move the collar 60 away from the plate 53 of the governor 49 and permit said governor to act under centrifugal action. The operation of the valve 37 into an open position is brought about by the main control lever 73 operating the segmental gear 74 and the latter in turn rotating the pinion 75. As the pinion 75 rotates it causes the movement of the rod 78 which imparts movement to the control levers 38 and 62. When the collar 60 is in engagement with the plates 53 of the governor 49 the governor arms thereof are prevented from expanding under centrifugal action and consequently the valves 30 are kept open. When the valves 30 are open the fluid forced into the casing 22 by the pumps passes therefrom consequently interrupting the drive between the drive shaft and the intermediate shaft. However, when the main control lever 73 is positioned in either forward or reverse positions the control lever 62 is moved to disengage the collar 60 from the plates 53 and allow the governor 49 to act under centrifugal force. As the governor arms swing outwardly they move the valves 30 toward closed position retarding the escape of fluid from the casing 22, the fluid being under pressure by the gears 28 coacting with the ring gear 24 and as the slowing down of the escape of fluid from the casing 22 increases greater resistance is offered against the gears 28 and ring gear 24 causing rotation of the casing 22 and intermediate shaft at a slower rate of speed than the drive shaft.

As the speed of the intermediate shaft increases the governor 55 acts and decreases the tension on the spring 59 allowing the collar 60 to slide further to the left in Figure 1 which permits the governor arms 50 of the governor 49 to expand to a greater extent and thereby bring about complete closing of the valves 30. When the valves 30 are closed the fluid is trapped within the casing 22 bringing about a positve drive between the drive shaft and the driven shaft.

It will be seen that through the arrangement of governors, valves and pumps and control means, as shown in the drawings and described in detail, variable speeds between the drive and driven shafts may be obtained in accordance with the speed of rotation of the drve shaft and that the driven shaft may be rotated by the drive shaft in the same direction thereof through the intermediate shaft or driven in a reverse direction all of which is under direct manual control through the operation of the main control lever 73.

A device of this character may be employed where it is desired to provide a variable speed transmission between a drive and driven shafts and also to incorporate between said shafts a clutch whereby the shafts may be disconnected from each other. Thus it will be seen that this device may be especially useful on motor vehicles and other similar devices and will operate silently, smoothly and with constant torque at the various speeds with friction reduced to a minimum.

It is to be understood that the housing 5 is substantially filled with a liquid preferably of a light grade of oil which is employed for the lubrication of the various parts as well as for operating the hydraulic mechanism of the transmission.

In this invention pumps 40 and 41 are employed. The pump 41 is in operation at any time that the engine is running due to the fact that this pump is driven directly by the engine. The pump 40 is only driven while the shaft 14 is in motion and acts as an auxiliary pump to the pump 41.

It is believed that the foregoing description, when taken in connection with the drawings, will fully set forth the construction and advantages of this invention to those skilled in the art to which such a device relates, so that further detailed description will not be required.

What I claim is:

1. In a hydraulic clutch, a housing, aligned drive, intermediate and driven shafts journaled in said housing, a clutch means in said housing and acting to connect and disconnect the intermediate and driven shafts, a casing secured on the drive shaft and provided with ports and having the intermediate shaft extending therein, a ring gear secured to the intermediate shaft and operating in the casing and having ports to align with the first-named ports, valves for controlling said first-named ports, gears journaled in said casing and meshing with said ring gear and coacting therewith and the casing in forming pumps for compressing fluid and forcing said fluid through the first-named ports when opened and acting to establish a drive connection between the intermediate shaft and the drive shaft when said first-named ports are partly open and closed, and a governor mechanism for controlling said valves, and means for supplying the casing with fluid from the housing.

2. In a hydraulic clutch, a housing, aligned drive, intermediate and driven shafts journaled in said housing, a clutch means in said housing and acting to connect and disconnect the intermediate and drive shafts, a casing secured on the drive shaft and provided with ports and having the intermediate shaft extending therein, a ring gear secured to the intermediate shaft and operating in the casing and having ports to align with the first-named ports, valves for controlling said first-named ports, gears journaled in said casing and meshing with said ring gear and coacting therewith and the casing in forming pumps for compressing fluid and forcing said fluid through the first-named ports when opened and acting to establish a drive connection between the intermediate shaft and the drive shaft when said first-named ports are partly open and closed, said intermediate shaft having a chamber and a passage connecting with said chamber and with the casing, a main control valve for controlling said chamber to said housing, and a governor mechanism for operating the first-named valves.

3. In a hydraulic clutch, a housing, aligned drive, intermediate and driven shafts journaled in said housing, a clutch means in said housing and acting to connect and disconnect the intermediate and driven shafts, a casing secured on the drive shaft and provided with ports and having the intermediate shaft extending therein, a ring gear secured to the intermediate shaft and operating in the casing and having ports to align with the first-named ports, valves for controlling said first-named ports, gears journaled in said casing and meshing with said ring gear and coacting therewith and the casing in forming pumps for compressing fluid and forcing said fluid through the first-named ports when opened and acting to establish a drive connection between the intermediate shaft and the drive shaft when said first-named ports are partly open and closed, said intermediate shaft having a chamber and a passage connecting with said chamber and with the casing, a main control valve for controlling said chamber to said housing, a governor mechanism actuated by the rotation of said casing and connected to the first-named valves for the opening and closing of said first-named valves.

4. In a hydraulic clutch, a housing, aligned drive, intermediate and driven shafts journaled in said housing, a clutch means in said housing and acting to connect and disconnect the intermediate and drive shafts, a casing secured on the drive shaft and provided with ports and having the intermediate shaft extending therein, a ring gear secured to the intermediate shaft and operating in the casing and having ports to align with the first-named ports, valves for controlling said first-named ports, gears journaled in said casing and meshing with said ring gear and coacting therewith and the casing in forming pumps for compressing fluid and forcing said fluid through the first-named ports when opened and acting to establish a drive connection between the intermediate shaft and the drive shaft when said first-named ports are partly open and closed, said intermediate shaft having a chamber and a passage connecting with said chamber and with the casing, a main control valve for controlling fluid flow from said chamber to said housing, a governor mechanism actuated by the rotation of said casing and connected to the first-named valves for the opening and closing of said latter valves, a second governor operated by the intermediate shaft for controlling the action of the first-named governor, means including a control lever for controlling the second-named governor, and a manually operated means for operating the clutch means and the main control valve and said control lever.

5. In a hydraulic transmission, a housing, aligned drive, intermediate and driven shafts journaled in said housing, a clutch means for the intermediate and driven shafts, a hydraulic means for connecting the drive and intermediate shafts and including a governor mechanism for the control thereof, a second governor mechanism actuated by the intermediate shaft for the control of the first-named governor mechanism and including a control lever, said intermediate shaft having a chamber and a passage in communication therewith and communicating with said hydraulic means, power driven pumps connected with said chamber, a main valve for controlling the fluid flow from the pumps to said chamber, and a manual control for operating said clutch means, main control valve and said control lever, said pumps receiving fluid from the housing and said hydraulic means exhausting fluid to said housing under certain conditions.

GIFFORD W. CHESTER.